United States Patent
Shimma

(10) Patent No.: US 11,184,516 B2
(45) Date of Patent: Nov. 23, 2021

(54) IMAGING APPARATUS, CONTROL METHOD FOR IMAGING APPARATUS, AND STORAGE MEDIUM

(71) Applicant: CANON KABUSHIKI KAISHA, Tokyo (JP)

(72) Inventor: Naoki Shimma, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/871,399

(22) Filed: May 11, 2020

(65) Prior Publication Data

US 2020/0366829 A1    Nov. 19, 2020

(30) Foreign Application Priority Data

May 13, 2019  (JP) .............................. JP2019-090944

(51) Int. Cl.
*H04N 5/232* (2006.01)

(52) U.S. Cl.
CPC ..... *H04N 5/23203* (2013.01); *H04N 5/23245* (2013.01)

(58) Field of Classification Search
CPC .......... H04N 5/23203; H04N 5/23206; H04N 5/23245; H04N 5/2353; H04N 1/0035; H04N 1/2112; H04N 1/215
See application file for complete search history.

(56) References Cited

U.S. PATENT DOCUMENTS

| 8,243,182 B2* | 8/2012 | Petrescu | H04N 5/23219 348/333.12 |
| 9,344,615 B1* | 5/2016 | Bostick | G06K 7/1417 |
| 2015/0054965 A1* | 2/2015 | Sudo | H04N 5/2354 348/169 |
| 2016/0088230 A1* | 3/2016 | Flores | H04N 5/23216 348/211.4 |
| 2016/0191791 A1* | 6/2016 | Tokairin | H04N 5/23216 348/333.02 |

FOREIGN PATENT DOCUMENTS

JP    2005-172898 A    6/2005

* cited by examiner

*Primary Examiner* — Kelly L Jerabek
(74) *Attorney, Agent, or Firm* — Cowan, Liebowitz & Latman, P.C.

(57) ABSTRACT

An imaging apparatus comprises a communication unit configured to communicate with an external device; and a controller configured to control shooting, wherein if (a) an accepted shooting instruction is a shooting start request issued by remote control from the external device via the communication unit, (b) a self-timer shooting function, which starts counting a timer time in response to the shooting instruction and starts shooting at an end of the counting, is enabled, and (c) the timer time is set to a first time longer than a predetermined time, the controller changes the timer time to a second time shorter than the predetermined time.

15 Claims, 7 Drawing Sheets

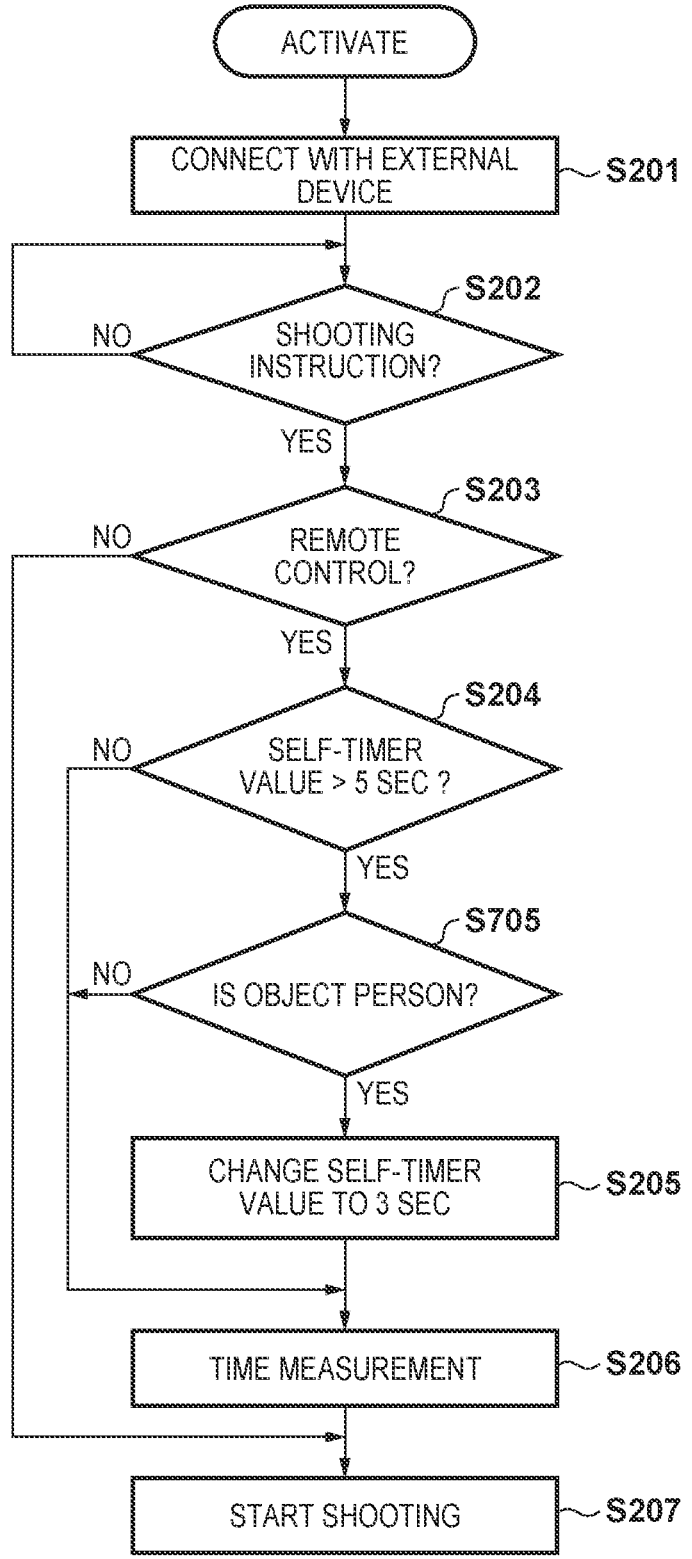

IMAGING APPARATUS, CONTROL METHOD FOR IMAGING APPARATUS, AND STORAGE MEDIUM

BACKGROUND OF THE INVENTION

Field of the Invention

The present invention relates to an imaging apparatus, a control method for the imaging apparatus, and a storage medium.

Description of the Related Art

There is known self-timer shooting in which a self-timer time is set and shooting is performed after the set self-timer time elapses since a shooting instruction is received from a user. There is also known a technique of improving the user convenience by changing the set self-timer time in accordance with conditions. For example, Japanese Patent Laid-Open No. 2005-172898 discloses a technique of detecting an object blur, and prolonging, if it is determined that the object blur is large, a self-timer time.

Japanese Patent Laid-Open No. 2005-172898 discloses a technique of automatically prolonging the self-timer time. However, there is not provided a technique of automatically shortening the self-timer time. Thus, for example, a case in which the user has to wait for a lapse of the self-timer time although shooting conditions are satisfied can often occur. Although the self-timer time can be manually preset, there is not provided a technique of automatically shortening the set self-timer time after a shooting instruction. Therefore, there is a problem in terms of convenience about this point.

SUMMARY OF THE INVENTION

The present invention provides, for example, an imaging apparatus advantageous in improving the convenience of self-timer shooting.

The present invention in its one aspect provides an imaging apparatus comprising a communication unit configured to communicate with an external device, and a controller configured to control shooting, wherein if (a) an accepted shooting instruction is a shooting start request issued by remote control from the external device via the communication unit, (b) a self-timer shooting function, which starts counting a timer time in response to the shooting instruction and starts shooting at an end of the counting, is enabled, and (c) the timer time is set to a first time longer than a predetermined time, the controller changes the timer time to a second time shorter than the predetermined time.

Further features of the present invention will become apparent from the following description of exemplary embodiments (with reference to the attached drawings).

BRIEF DESCRIPTION OF THE DRAWINGS

FIG. 7 is a flowchart of a control method for a camera according to the fifth embodiment.

DESCRIPTION OF THE EMBODIMENTS

Figure 1:
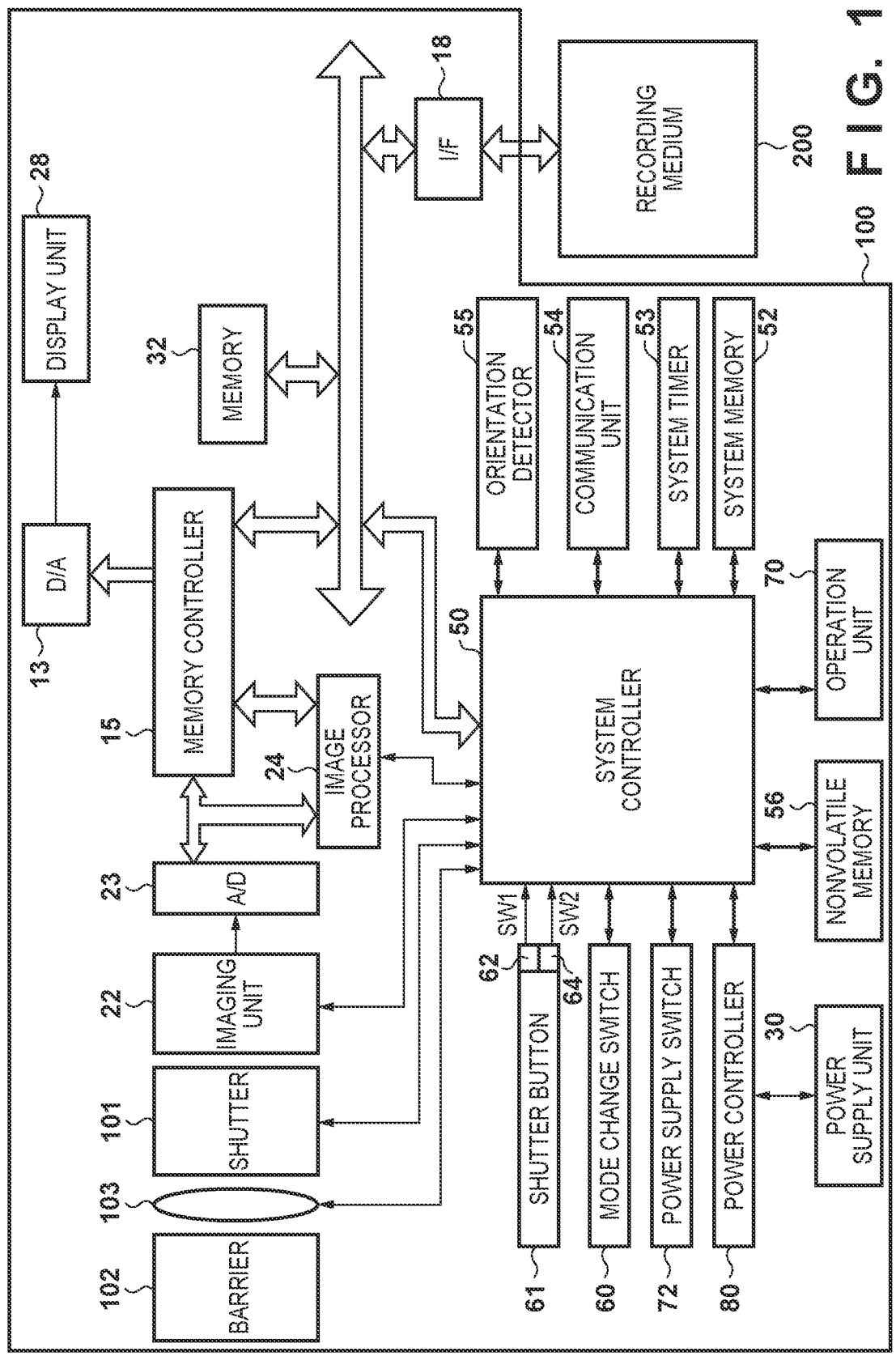
FIG. 1 is a block diagram showing the arrangement of a camera according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing an example of the arrangement of a camera 100 (digital camera) as an imaging apparatus according to the embodiment. Referring to FIG. 1, a shooting lens 103 is a lens group including a zoom lens and a focus lens. A shutter 101 is a shutter having a stop function. An imaging unit 22 is an image sensor formed from a CCD or CMOS element that converts an optical image into an electrical signal. An A/D converter 23 converts an analog signal into a digital signal. The A/D converter 23 is used to convert an analog signal output from the imaging unit 22 into a digital signal. A barrier 102 covers an imaging system including the shooting lens 103 of the camera 100, thereby preventing any dirt and damage to the imaging system including the shooting lens 103, the shutter 101, and the imaging unit 22.

An image processor 24 performs color conversion processing or resize processing such as predetermined pixel interpolation or reduction processing for data from the A/D converter 23 or data from a memory controller 15. The image processor 24 also performs predetermined arithmetic processing using captured image data. Based on an obtained arithmetic result, a system controller 50 performs exposure control and distance measurement control. This performs AF (Auto Focus) processing, AE (Auto Exposure) processing, and EF (Electronic pre-Flash) processing by the TTL (Through The Lens) method. The image processor 24 further executes predetermined arithmetic processing using the captured image data, thereby performing AWB (Auto White Balance) processing by the TTL method based on an obtained arithmetic result.

Output data from the A/D converter 23 is written in a memory 32 via the image processor 24 and the memory controller 15 or via the memory controller 15. The memory 32 stores image data obtained by the imaging unit 22 and converted into digital data by the A/D converter 23 or image data to be displayed on a display unit 28. The memory 32 has a storage capacity enough to store a predetermined number of still images or a moving image and audio of a predetermined time. The memory 32 also serves as an image display memory (video memory). A D/A converter 13 converts image display data stored in the memory 32 into an analog signal and supplies it to the display unit 28. The display image data written in the memory 32 is thus displayed on the display unit 28 via the D/A converter 13.

The display unit 28 performs display according to the analog signal from the D/A converter 13 on a display device such as an LCD. A digital signal temporarily A/D-converted by the A/D converter 23 and accumulated in the memory 32 is converted into an analog signal by the D/A converter 13 and sequentially transferred to the display unit 28. The display unit 28 can thus function as an electronic viewfinder by displaying the analog signals, thereby performing through image display (live view display).

A nonvolatile memory 56 is a memory as an electrically erasable/recordable recording medium, and for example, an EEPROM is used. The nonvolatile memory 56 stores constants, programs, and the like for the operation of the system controller 50. The programs include computer programs used to execute various kinds of flowcharts (to be described later). A setting value for self-timer shooting (to be described later) is also stored in the nonvolatile memory 56.

The system controller 50 controls the entire camera 100. The system controller 50 includes a processor that executes a program recorded in the above-described nonvolatile memory 56, thereby implementing each processing according to this embodiment (to be described later). A RAM is used as a system memory 52. The constants and variables for the operation of the system controller 50, the program read out from the nonvolatile memory 56, and the like are loaded into the system memory 52. The system controller 50 also performs display control by controlling the memory 32, the D/A converter 13, the display unit 28, and the like.

A system timer 53 is a timer unit that measures the time used for various kinds of control operations or the time of an internal clock. The time is measured using the system timer 53 in self-timer shooting (to be described later).

A mode change switch 60, a shutter button 61, and an operation unit 70 are operation units used to input various kinds of operation instructions to the system controller 50. The mode change switch 60 changes the shooting mode of the system controller 50 to one of a still image recording mode, a moving image shooting mode, a reproduction mode, and the like. Modes included in the still image recording mode are an auto shooting mode, an auto scene determination mode, a manual mode, a stop priority mode (Av mode), and a shutter speed priority mode (Tv mode). Also included are various scene modes that are shooting settings for shooting scenes, a program AE mode, and a custom mode. The shooting mode can directly be changed to one of these modes using the mode change switch 60. Alternatively, after temporarily changing to a screen of a list of shooting modes by the mode change switch 60, one of the plurality of displayed modes may be selected, and the shooting mode may be changed using another operation member. The moving image shooting mode may similarly include a plurality of modes.

A first shutter switch 62 is turned on by operating the shutter button 61 provided on the camera 100 halfway, that is, by so-called half stroke (shooting preparation instruction), and generates a first shutter switch signal SW1. According to the first shutter switch signal SW1, operations for AF (Auto Focus) processing, AE (Auto Exposure) processing, AWB (Auto White Balance) processing, EF (Pre-Light Emission) processing, and the like are started.

A second shutter switch 64 is turned on by completing the operation of the shutter button 61, that is, by so-called full stroke (shooting instruction), and generates a second shutter switch signal SW2. According to the second shutter switch signal SW2, the system controller 50 starts an operation for a series of shooting processes from signal read from the imaging unit 22 to image data write in a recording medium 200.

The operation members of the operation unit 70 are appropriately assigned functions on a scene basis by selectively operating various kinds of function icons displayed on the display unit 28, and act as various kinds of function buttons. Examples of the function buttons are an end button, a return button, an image feed button, a jump button, a narrow-down button, and an attribute change button. For example, when a menu button is pressed, a menu screen capable of doing various kinds of settings is displayed on the display unit 28. The user can intuitively make various kinds of settings using the menu screen displayed on the display unit 28, a SET button, and four direction buttons, that is, up, down, left, and right buttons. Especially in this embodiment, a self-timer setting item concerning self-timer shooting is provided in the menu screen. Self-timer shooting indicates a function which starts counting (measuring) the timer time in response to a shooting instruction and starts shooting at the end of the counting. Enabling/disabling of the self-timer shooting function can be set from the self-timer setting item in the menu screen. If the self-timer shooting function is enabled, a self-timer value (timer time) can be set. As described above, information of enabling/disabling of the self-timer shooting function and the set timer time are stored in the nonvolatile memory 56. Note that if the self-timer value is set to 0 without additionally providing information of enabling/disabling of the self-timer shooting function, this may indicate disabling of the self-timer shooting function.

A power controller 80 is formed from a battery detection circuit, a DC/DC converter, a switch circuit configured to switch a block to be energized, and the like, and detects the presence/absence of mounting of a battery, the type of the battery, and the battery level. Based on the detection result and an instruction from the system controller 50, the power controller 80 controls the DC/DC converter and supplies a necessary voltage to the units including the recording medium 200 for a necessary period.

A power supply unit 30 includes a primary battery such as an alkali battery or a lithium battery, a secondary battery such as an NiCd battery, an NiMH battery, or an Li ion battery, and an AC adapter. A recording medium I/F 18 is an interface to the recording medium 200 such as a memory card or a hard disk. The recording medium 200 is a recording medium such as a memory card for recording a shot image, and is formed from a semiconductor memory, an optical disk, a magnetic disk, or the like.

A communication unit 54 is connected wirelessly or via a cable and transmits/receives a video signal, an audio signal, and the like. The communication unit 54 can also be connected to a wireless LAN (Local Area Network) or the Internet. The communication unit 54 can transmit an image (including a through image) captured by the imaging unit 22 or an image recorded in the recording medium 200, and can also receive image data and various kinds of information. Especially in this embodiment, the communication unit 54 establishes, for example, wireless connection to an external device, thereby enabling remote control from the external device. The external device is not limited to a dedicated remote control device, and may be an arbitrary electronic device capable of communicating with the camera 100. Examples of the electronic device are a digital camera, a smartphone, a personal computer, a tablet computer, a media player, a PDA, a game machine, and a smart watch. The present invention, however, is not limited to them. Wireless connection at this time can be, for example, wireless connection complying with Bluetooth® Low Energy. The communication unit 54 accepts an operation request from the user via the external device, and notifies the system controller 50 of it. The system controller 50 controls the respective units in accordance with the received operation request.

An orientation detector 55 detects the orientation of the camera 100 with respect to the direction of gravity. Based on the orientation detected by the orientation detector 55, it can be determined whether the image shot by the imaging unit 22 is an image shot by holding the camera 100 horizontally or vertically. The system controller 50 can add information of the orientation detected by the orientation detector 55 to the image file of the image captured by the imaging unit 22. In addition, the system controller 50 can rotate the image based on the information of the orientation detected by the orientation detector 55, and record it. As the orientation detector 55, an acceleration sensor or a gyro sensor is usable.

Figure 2:
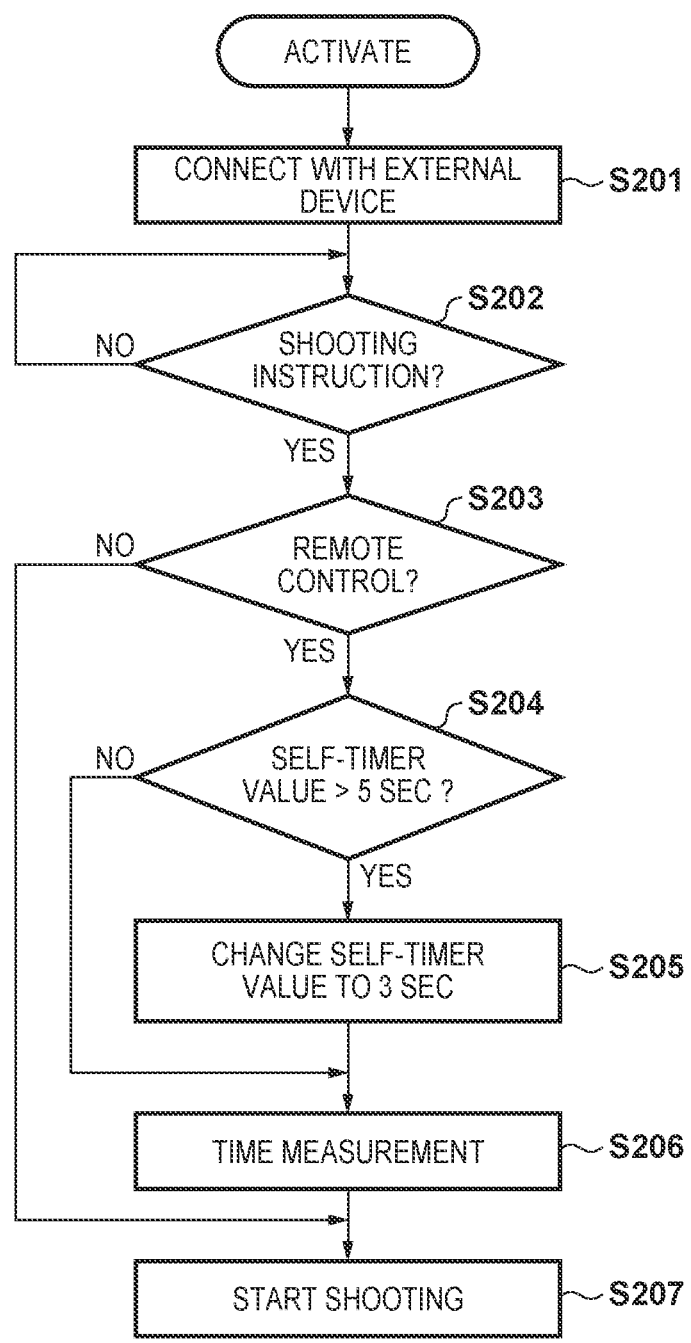
FIG. 2 is a flowchart of a control method for the camera according to the first embodiment.

A control method for the camera 100 according to this embodiment will be described next with reference to a flowchart shown in FIG. 2. Note that a program corresponding to this flowchart is stored in the nonvolatile memory 56, and executed by the system controller 50.

In an initial state in which the camera 100 is activated, communication connection setting on the side of the camera 100 is executed in accordance with the operation of the operation unit 70 by the user. At this time, when communication connection setting on the external device side is executed by operating the external device, connection between the camera 100 and the external device is established in step S201. More specifically, the camera 100 broadcasts an advertising signal, and the external device transmits, to the camera 100, a connection request signal in response to reception of the advertising signal, thereby establishing Bluetooth connection. This enables remote control of the camera 100 from the external device.

In step S202, the system controller 50 determines whether a shooting instruction is accepted. At this time, the shooting instruction can be a shooting instruction issued when the shutter button 61 is fully pressed, or a shooting start request issued by remote control from the external device via the communication unit 54. If the shooting instruction is accepted, the process advances to step S203; otherwise, the process stands by for reception of the shooting instruction.

In step S203, the system controller 50 determines whether the accepted shooting instruction is the shooting start request issued by remote control from the external device. If remote control is determined, the process advances to step S204; otherwise (that is, the shooting instruction issued by the shutter button 61), the process advances to step S207.

In step S204, the system controller 50 determines whether the self-timer shooting function is enabled. If the self-timer shooting function is enabled, it is determined whether the self-timer value is set to the first time longer than a predetermined time. The predetermined time is a preset threshold time, for example, 5 sec in this example. If the self-timer value is set to the first time longer than the predetermined time, the process advances to step S205; otherwise, the process advances to step S206.

In step S205, the system controller 50 changes the self-timer value to the second time (for example, 3 sec) shorter than the predetermined time (for example, 5 sec). In this example, the self-timer value stored in the nonvolatile memory 56 may directly be rewritten, or may be changed by storing a temporary self-timer value in the system memory 52. In step S206, the system controller 50 starts counting the set self-timer value. When the counting ends, the process advances to step S207. In step S207, the system controller 50 starts capturing a still image or moving image by controlling the respective units.

According to the above control method, the system controller 50 determines the following conditions.

(a) The accepted shooting instruction is the shooting start request issued by remote control from the external device via the communication unit 54 (steps S202 and S203).

(b) The self-timer shooting function is enabled (step S204).

(c) The timer time is set to the first time longer than the predetermined time (step S204).

If all the above conditions are satisfied, the system controller 50 changes the timer time to the second time shorter than the predetermined time.

According to this control operation, it is possible to prevent a situation in which when the user performs remote control of the camera 100 using the external device, shooting starts according to the predetermined timer time and thus the user waits for a long time. If, for example, framing and the like are already confirmed on the external device side, this control operation can improve the user convenience.

Second Embodiment

As described above, the camera 100 has a plurality of shooting modes so as to perform appropriate shooting in accordance with various statuses. A camera 100 according to this embodiment can change a self-timer value in accordance with the shooting mode.

Figure 3:
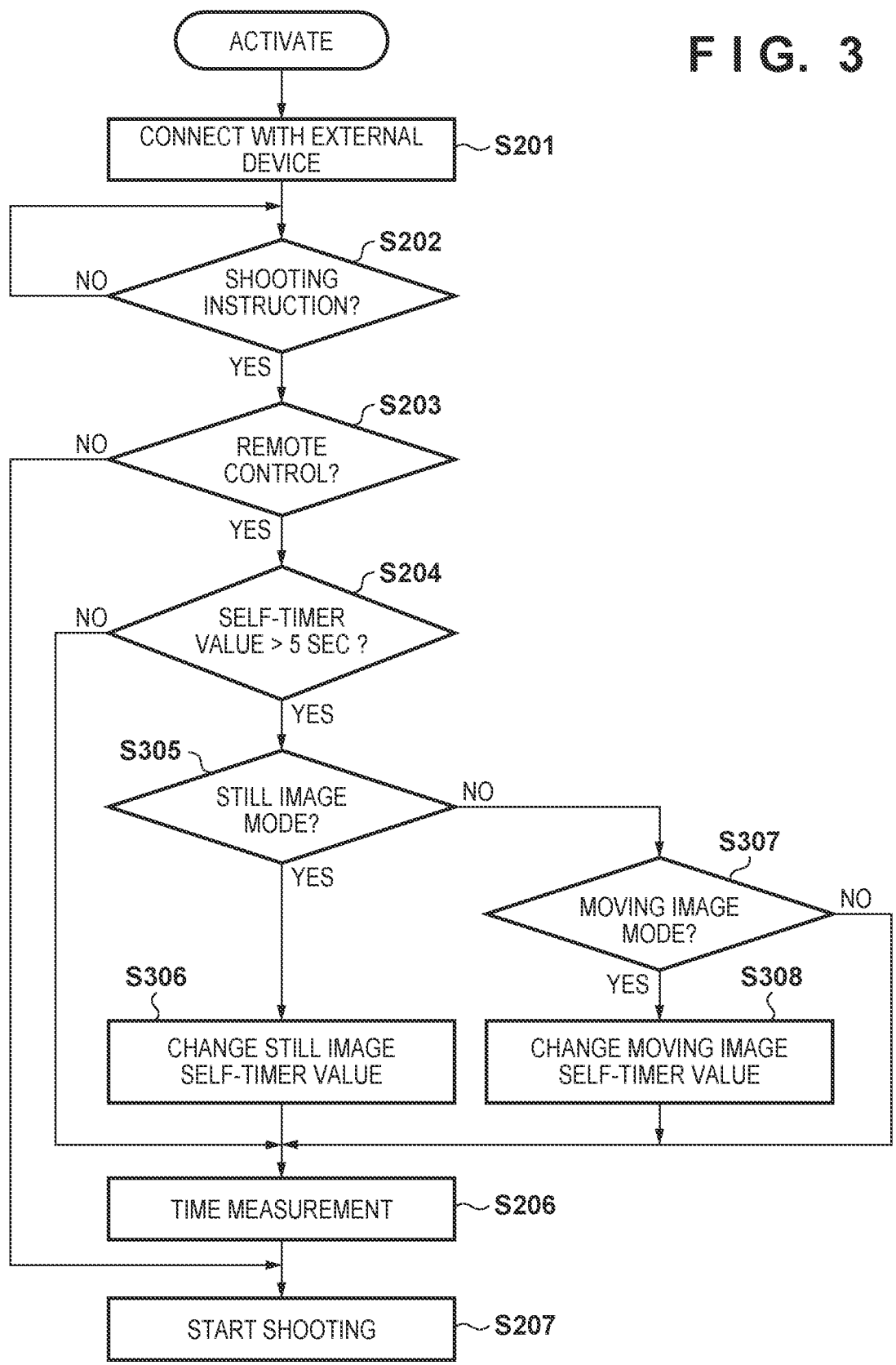
FIG. 3 is a flowchart of a control method for a camera according to the second embodiment.

FIG. 3 shows a flowchart of a control method for the camera 100 according to this embodiment. FIG. 3 is different from FIG. 2 in that processes in steps S305 to S308 are provided instead of step S205. In step S305, a system controller 50 determines the shooting mode by acquiring the state of a mode change switch 60, and determines whether the shooting mode is a still image mode. If the shooting mode is the still image mode, the process advances to step S306; otherwise, the process advances to step S307.

In step S306, the system controller 50 changes the self-timer value to a still image self-timer value. In step S307, the system controller 50 determines whether the shooting mode of the camera 100 is a moving image mode. If the shooting mode is the moving image mode, the process advances to step S308; otherwise, the process advances to step S309. In step S308, the system controller 50 changes the self-timer value to a moving image self-timer value. In step S205 according to the first embodiment, the self-timer value is changed to the second time (for example, 3 sec) shorter than the predetermined time. In this embodiment, however, the second time is a time (the still image self-timer value or the moving image self-timer value) corresponding to the shooting mode.

As described above, it is possible to perform shooting using the self-timer value suitable for each shooting mode. Note that in this embodiment, the self-timer value is changed in the two shooting modes of the still image mode and the moving image mode. However, the self-timer value may similarly be changed in another shooting mode or three or more shooting modes.

Third Embodiment

As described above, as the external device that performs remote control of the camera 100, there are various devices such as a smartphone, a tablet computer, and a smart watch in addition to the dedicated remote control device. If, for example, the external device is a smartphone, a tablet computer, or the like that includes a liquid crystal monitor on which the user can confirm framing in advance, it is possible to confirm the status of an object in advance, and thus the self-timer value may often be made small. A camera 100 according to this embodiment determines whether to change a self-timer value in accordance with the type of an external device.

Figure 4:
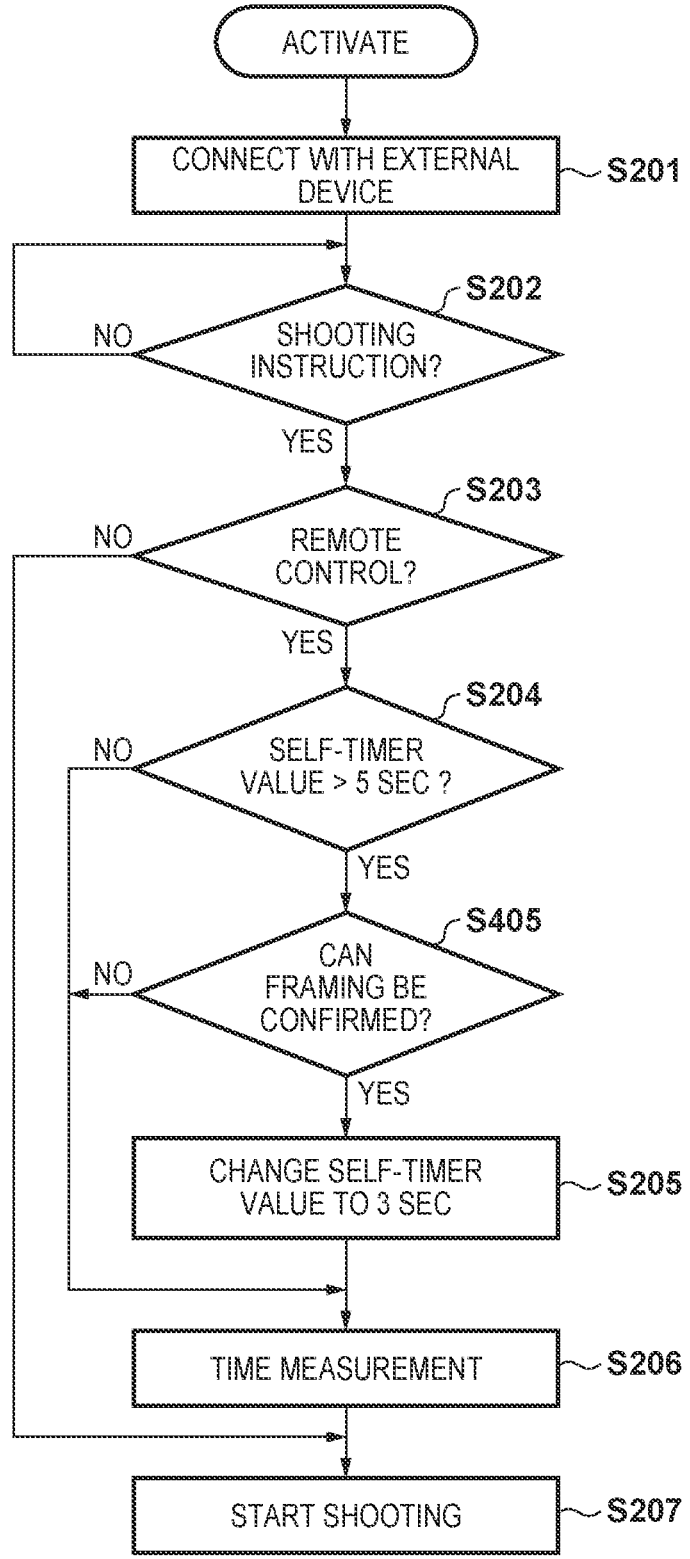
FIG. 4 is a flowchart of a control method for a camera according to the third embodiment.

FIG. 4 shows a flowchart of a control method for the camera 100 according to this embodiment. FIG. 4 is different from FIG. 2 in that step S405 intervenes between steps S204 and S205. In this embodiment, assume that a shooting start request received in step S202 includes information of the model of the external device as a transmission source. In step S405, based on the information of the model of the external device included in the shooting start request received in step S202, a system controller 50 determines whether framing (a range for cutting an object) can be confirmed on the external device side. Whether framing can be confirmed on the external device side is determined by, for example, determining based on the information of the model of the external device whether a liquid crystal monitor is mounted on the external device. If framing can be confirmed on the external device side, the process advances to step S205; otherwise, the process advances to step S206.

With the intervention of the determination processing in step S405, if the information of the model of the external device indicates that the external device is of a model which allows confirmation of framing, the system controller 50 enables a change of the self-timer value to the second time in step S205. On the other hand, if the information of the model of the external device does not indicate that the external device is of a model which allows confirmation of framing, the system controller 50 disables the change of the self-timer value to the second time in step S205.

According to this embodiment, if the external device is a smartphone, a tablet computer, or the like that includes a liquid crystal monitor on which the user can confirm framing in advance, it is possible to decrease the self-timer value to shorten the wait time until shooting starts. Conversely, if the external device is a remote controller or the like that does not include such liquid crystal monitor, it is possible to ensure the preparation time of the user (object) before shooting starts by performing shooting without decreasing the self-timer value.

Fourth Embodiment

In each of the above-described embodiments, the arrangement in which the self-timer value is set on the side of the camera 100 is adopted. However, an arrangement in which the self-timer value is designated from the external device that performs remote control of the camera 100 may be possible. In this case, since it is considered that the user explicitly sets the self-timer value, it is highly likely better to perform self-timer shooting in accordance with the setting. To cope with this, a camera 100 according to this embodiment preferentially applies designation of a self-timer value from an external device side.

Figure 5:
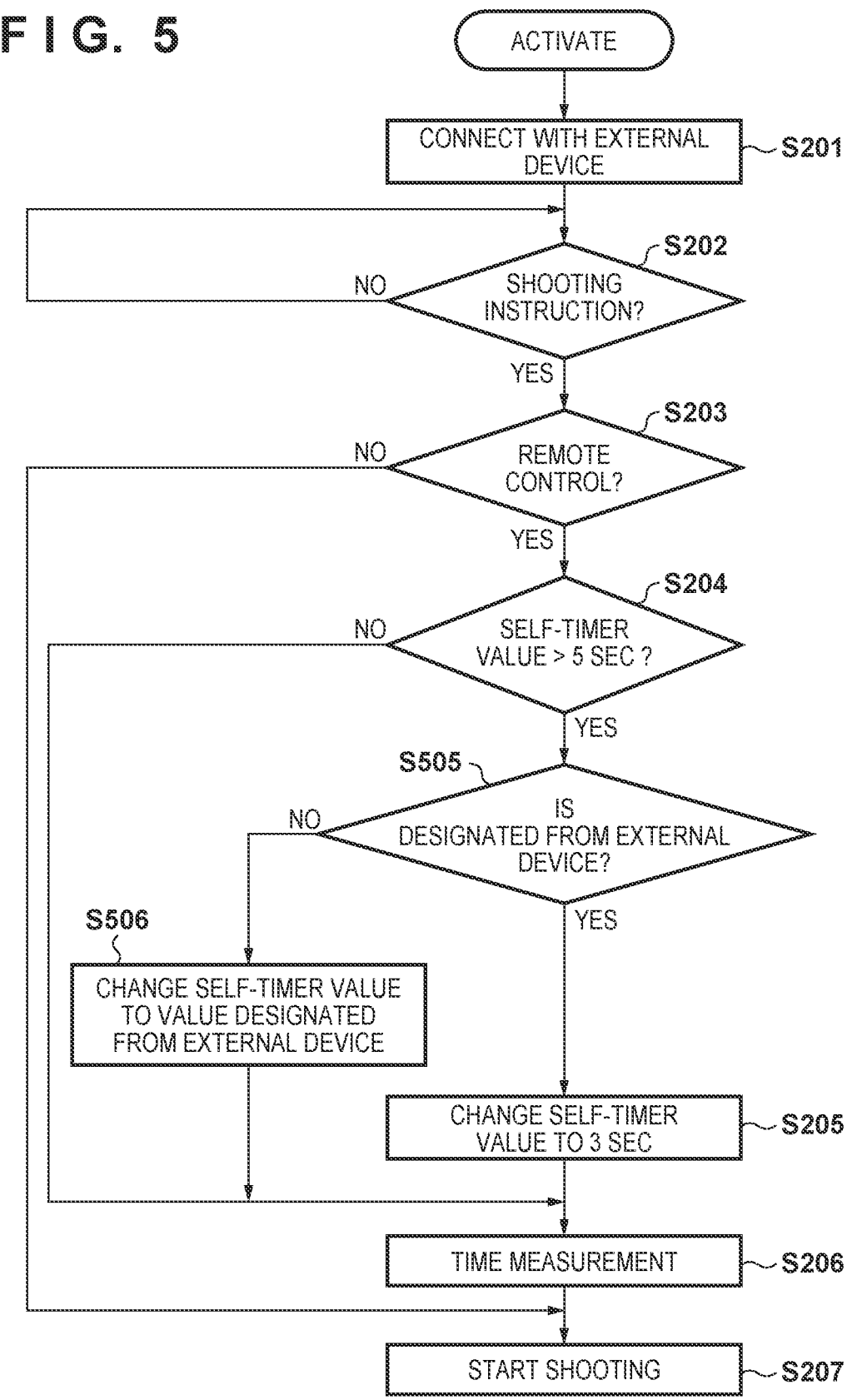
FIG. 5 is a flowchart of a control method for a camera according to the fourth embodiment.

FIG. 5 shows a flowchart of a control method for the camera 100 according to this embodiment. FIG. 5 is different from FIG. 2 in that a branch of steps S505 and S506 intervenes between steps S204 and S205.

In this embodiment, a shooting start request received in step S202 includes a designated value (a designated time of a timer time) of the self-timer value. In step S505, a system controller 50 determines whether the self-timer value included in the shooting start request received in step S202 is an effective value. If the self-timer value included in the shooting start request is, for example, 0 or Null, it is determined that the self-timer value is an ineffective value. If the self-timer value included in the shooting start request is an ineffective value, it is determined that there is no designation of the self-timer value from the external device, and the self-timer value is determined in accordance with setting on the side of the camera 100. On the other hand, if the self-timer value included in the shooting start request is an effective value, it is determined that the self-timer value is explicitly designated from the external device. If it is determined that the self-timer value is designated from the external device, the process advances to step S506; otherwise, the process advances to step S205. In step S506, the self-timer value is changed to the value (the self-timer value included in the shooting start request) designated from the external device.

As described above, if the designated value (the designated time of the timer time) of the self-timer value is included in the shooting start request, a change of the self-timer value to the second time in step S205 is disabled, and the self-timer value is changed to the designated value. If the self-timer value is designated from the external device, self-timer shooting is performed in accordance with the designated value, thereby making it possible to prevent shooting unintended by the user.

Figure 6:
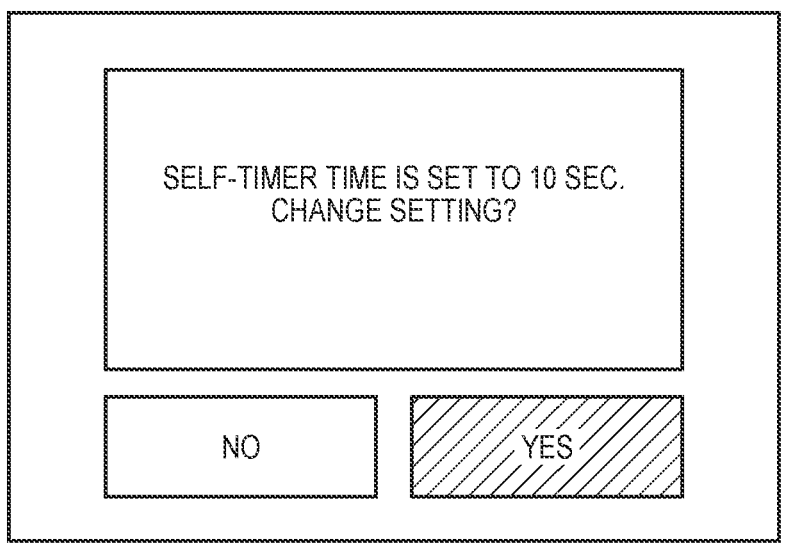
FIG. 6 is a view showing an example of guidance display according to the fourth embodiment.

If it is determined in step S505 that the self timer value is designated from the external device, that is, the designated value of the self-timer value is included in the shooting start request, the system controller 50 may transmit, to the external device via a communication unit 54, a notification for prompting a change of the designated value. In response to reception of the notification, the external device performs, for example, guidance display, as shown in FIG. 6. As guidance display, for example, "The self-timer time is set to 10 sec. Will you change the setting?" is displayed. If the user selects "YES" in a screen shown in FIG. 6, the external device displays a screen (not shown) for resetting the self-timer value, thereby allowing the user to change the self-timer value.

Conversely, the self-timer value may be changed as in the first embodiment, the external device may be notified that the self-timer value has been changed, and the external device may perform guidance display of it, thereby making a notification to the user.

Fifth Embodiment

As a use case in which self-timer shooting is performed, a person is an object in many cases. If it is determined that an object is a person, a self-timer value may be changed.

FIG. 7 shows a flowchart of a control method for a camera 100 according to this embodiment. FIG. 7 is different from FIG. 2 in that step S705 intervenes between steps S204 and S205. In step S705, a system controller 50 receives a processing result of an image processor 24, and determines whether an object is a person. Whether the object is a person can be determined using a known face detection algorithm. If the object is a person, the process advances to step S205; otherwise, the process advances to step S206.

With the intervention of the determination processing in step S705, if it is determined that the object is a person, the system controller 50 enables a change of the self-timer value to the second time in step S205. On the other hand, if it is not determined that the object is a person, the system controller 50 disables the change of the self-timer value to the second time in step S205.

Note that in step S705, instead of determining whether the object is a person, it may be determined whether the camera 100 is set to a shooting mode (a portrait mode or a self portrait mode in which a photographer is an object) for capturing a person.

The preferred embodiments of the present invention have been explained above. However, the present invention is not limited to these embodiments, and various changes and modifications can be made within the spirit and scope of the present invention. For example, in the first embodiment, the threshold value (predetermined time) of the self-timer value is 5 sec and the changed self-timer value is 3 sec. However, the present invention is not limited to these specific numbers of seconds. Furthermore, when changing the self-timer value, the self-timer value may be selectable by the user in advance from a menu or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-090944, filed May 13, 2019, which is hereby incorporated by reference herein in its entirety.

What is claimed is:

1. An imaging apparatus comprising:
a communication interface; and
a controller configured to control shooting,
wherein the controller communicates with an external device via the communication interface,
wherein if (a) an accepted shooting instruction is a shooting start request issued by remote control from the external device via the communication interface, (b) a self-timer shooting function, which starts counting a timer time in response to the shooting instruction and starts shooting at an end of the counting, is enabled, and (c) the timer time is set to a first time longer than a predetermined time, the controller changes the timer time to a second time shorter than the predetermined time,
wherein if the shooting start request includes a designated time of the timer time, the controller disables the change of the timer time to the second time, and changes the timer time to the designated time.

2. The apparatus according to claim 1, wherein the second time is a time corresponding to a shooting mode of the imaging apparatus.

3. The apparatus according to claim 1, wherein
the shooting start request includes information of a model of the external device, and
if the information indicates that the external device is of a model which allows confirmation of framing, the controller enables the change of the timer time to the second time;
otherwise, the controller disables the change of the timer time to the second time.

4. The apparatus according to claim 1, wherein if the shooting start request includes a designated time of the timer time, the controller transmits, to the external device via the communication interface, a notification for prompting a change of the designated time.

5. The apparatus according to claim 1, further comprising a determination unit configured to determine whether an object is a person,
wherein if the determination unit determines that the object is the person, the controller enables the change of the timer time to the second time; otherwise, the controller disables the change of the timer time to the second time.

6. The apparatus according to claim 1, wherein if the imaging apparatus is set to one of a portrait mode and a self portrait mode in which a photographer is an object, the controller enables the change of the timer time to the second time; otherwise, the controller disables the change of the timer time to the second time.

7. The apparatus according to claim 1, further comprising a setting unit configured to set the second time in accordance with a user operation.

8. A control method for an imaging apparatus including a communication interface, the method comprising:
communicating with an external device,
changing a timer time to a second time shorter than a predetermined time if (a) an accepted shooting instruction is a shooting start request issued by remote control from the external device via the communication interface, (b) a self-timer shooting function, which starts counting the timer time in response to the shooting instruction and starts shooting at an end of the counting, is enabled, and (c) the timer time is set to a first time longer than the predetermined time, wherein if the shooting start request includes a designated time of the timer time, the controller disables the change of the timer time to the second time, and changes the timer time to the designated time.

9. The control method according to claim 8, wherein the second time is a time corresponding to a shooting mode of the imaging apparatus.

10. The control method according to claim 8, wherein the shooting start request includes information of a model of the external device, and if the information indicates that the external device is of a model which allows confirmation of framing, enabling the change of the timer time to the second time; otherwise, disabling the change of the timer time to the second time.

11. The control method according to claim 8, wherein if the shooting start request includes a designated time of the timer time, transmitting, to the external device via the communication interface, a notification for prompting a change of the designated time.

12. The control method according to claim 8, further comprising:

determining whether an object is a person, wherein if it is determined that the object is the person, enabling the change of the timer time to the second time; otherwise, disabling the change of the timer time to the second time.

13. The control method according to claim 8, wherein if the imaging apparatus is set to one of a portrait mode and a self portrait mode in which a photographer is an object, enabling the change of the timer time to the second time; otherwise, disabling the change of the timer time to the second time.

14. The control method according to claim 8, further comprising:

setting the second time in accordance with a user operation.

15. A non-transitory computer-readable storage medium which stores a program for causing a computer to execute the method according to claim 8.

* * * * *